(12) United States Patent
Popa et al.

(10) Patent No.: US 11,554,837 B2
(45) Date of Patent: Jan. 17, 2023

(54) WATERCRAFT NAVIGATION LIGHT

(71) Applicant: Mark Allen Ebbenga, Shafer, MN (US)

(72) Inventors: Nicholas Popa, Forest Lake, MN (US); Mark Allen Ebbenga, Shafer, MN (US)

(73) Assignee: Mark Ebbenga, Shafer, MN (US)

( * ) Notice: Subject to any disclaimer, the term of this patent is extended or adjusted under 35 U.S.C. 154(b) by 0 days.

(21) Appl. No.: 17/006,530

(22) Filed: Aug. 28, 2020

(65) Prior Publication Data

US 2021/0061424 A1 Mar. 4, 2021

Related U.S. Application Data (60) Provisional application No. 62/893,685, filed on Aug. 29, 2019.

(51) Int. Cl.
| | |
|---|---|
| B63B 45/04 | (2006.01) |
| F21V 21/116 | (2006.01) |
| F21V 21/32 | (2006.01) |
| B63B 45/02 | (2006.01) |
| F21V 21/26 | (2006.01) |
| F21Y 115/10 | (2016.01) |

(52) U.S. Cl.
CPC ............. *B63B 45/04* (2013.01); *B63B 45/02* (2013.01); *F21V 21/116* (2013.01); *F21V 21/26* (2013.01); *F21V 21/32* (2013.01); *F21Y 2115/10* (2016.08)

(58) Field of Classification Search
CPC ........ F21V 21/116; F21V 21/26; F21V 21/32; F21V 33/0048; F21V 33/0084; Y10T 403/11; Y10T 403/459; B63B 45/02; B63B 45/04; E01F 9/635; E01F 9/627; E01F 9/631
See application file for complete search history.

(56) References Cited

U.S. PATENT DOCUMENTS

| | | | |
|---|---|---|---|
| 1,790,500 A * | 1/1931 | Fischer | F21V 21/32 |
| | | | 248/160 |
| 1,870,687 A | 8/1931 | McCandless | |
| 3,851,166 A * | 11/1974 | Kohler | B63B 45/02 |
| | | | 362/198 |

(Continued)

FOREIGN PATENT DOCUMENTS

| | | |
|---|---|---|
| RU | 32082 U1 | 9/2003 |
| SU | 1344680 A1 | 10/1987 |

(Continued)

OTHER PUBLICATIONS

International Search Report issued for PCT/US2020/048568, dated Oct. 29, 2020.

(Continued)

*Primary Examiner* — Zheng Song
(74) *Attorney, Agent, or Firm* — Westman, Champlin & Koehler, P.A.; Z. Peter Sawicki; Amanda M. Prose (57) ABSTRACT

A navigation light pole and method of protecting the navigation light and pole by providing a flexible joint at a base of the light pole which allows the light pole to bend about the flexible joint when the light or light pole is hit, for example, by a low clearance structure such as a bridge or boat lift to prevent damage to the light pole or light.

10 Claims, 5 Drawing Sheets

(56) References Cited

U.S. PATENT DOCUMENTS

| | | | | |
|---|---|---|---|---|
| 4,692,850 A * | 9/1987 | LeDoux | ................... | F21V 21/02 |
| | | | | 362/285 |
| 5,486,987 A | 1/1996 | Fritz, Jr. | | |
| 5,704,704 A * | 1/1998 | Reichard | .............. | B60Q 1/2657 |
| | | | | 362/267 |
| 6,019,489 A * | 2/2000 | Wiggerman | ......... | B60Q 1/2657 |
| | | | | 362/477 |
| 6,164,803 A * | 12/2000 | Reniger | ............... | B60Q 1/2657 |
| | | | | 114/353 |
| 6,176,601 B1 | 1/2001 | Nester | | |
| 6,308,653 B1 * | 10/2001 | Geraci | ................... | B63B 17/02 |
| | | | | 114/361 |
| 6,502,957 B1 * | 1/2003 | Klaitman | ................ | A47F 11/10 |
| | | | | 362/145 |
| 6,848,815 B1 * | 2/2005 | Born | ....................... | B63B 45/04 |
| | | | | 362/287 |
| 7,832,695 B2 * | 11/2010 | Ebel | ........................ | E01F 9/629 |
| | | | | 248/156 |
| 8,760,107 B2 * | 6/2014 | Kiss | ..................... | H01M 10/46 |
| | | | | 320/101 |
| 9,908,597 B1 * | 3/2018 | Benson | ................... | B63B 45/04 |
| 2005/0036309 A1 * | 2/2005 | Gavin | ................ | F21V 33/0084 |
| | | | | 362/198 |
| 2008/0202406 A1 * | 8/2008 | del Valle Bravo | ...... | B63B 17/02 |
| | | | | 114/361 |
| 2013/0039081 A1 * | 2/2013 | Czipri | ..................... | B63B 45/04 |
| | | | | 362/477 |
| 2013/0134898 A1 * | 5/2013 | Dias | .................... | H01L 25/0753 |
| | | | | 315/291 |
| 2014/0085910 A1 * | 3/2014 | Widgery | .............. | B60Q 1/2661 |
| | | | | 29/857 |
| 2015/0274267 A1 * | 10/2015 | Deven | .................. | F21V 31/005 |
| | | | | 362/477 |
| 2016/0355242 A1 * | 12/2016 | De Marcellus | ......... | B63B 45/02 |
| 2018/0251178 A1 | 9/2018 | Arms | | |
| 2019/0023363 A1 * | 1/2019 | Ardoin | .................... | F21V 21/26 |
| 2020/0017176 A1 * | 1/2020 | Peng | ..................... | B63B 45/00 |

FOREIGN PATENT DOCUMENTS

| | | |
|---|---|---|
| WO | 2018/206514 A1 | 11/2018 |
| WO | 2019070555 A1 | 4/2019 |

OTHER PUBLICATIONS

Written Opinion of the International Searching Authority issued for PCT/US2020/048568, dated Oct. 29, 2020.
International Search Report issued for PCT/US2020/048562, dated Oct. 29, 2020.
Written Opinion of the International Searching Authority issued for PCT/US2020/048562, dated Oct. 29, 2020.
Extended European Search Report issued for related European patent application serial No. EP20857515.9 dated Oct. 12, 2022.

* cited by examiner

WATERCRAFT NAVIGATION LIGHT

CROSS-REFERENCE TO RELATED APPLICATIONS

This application claims the benefit of and priority to U.S. provisional application Ser. No. 62/893,685, filed Aug. 29, 2019, the contents of which are incorporated herein in their entirety.

BACKGROUND

Boats and other watercraft generally require navigation lights, which in some instances include light poles which are vertically mounted to the highest point on the boat. These lights include a static pole that is mounted to the boat directly and having a light at the top of the pole.

When traversing under bridges or moving a boat into a boat lift for storage, the pole and/or light at the top of the pole are at a high risk of breakage from contacting the bottom of a bridge or the frame of a boat lift cover when the boat moves there below. Because the lights are generally held in a plastic shell on a fixedly mounted pole, the lights are easily broken and the pole can be broken off its mount.

Some navigation lights include a hinge at the base of the pole, allowing a boat operator to fold down the light manually when passing below a structure without enough clearance for the light. However, the user must remember to fold down the light before passing under a low clearance structure and must also remember to place the light back in the navigation position once back to open water.

SUMMARY

An aspect of the present disclosure relates to a lighted pole for mounting on a watercraft. The lighted pole has a base portion and a lighted tip, with a shaft or pole extending therebetween and a flexible joint positioned at or between the base portion and the shaft.

The base portion comprises a mounting bracket for mounting the lighted pole to a surface of the watercraft such that the lighted pole is installed in a position extending outwardly or upwardly from the watercraft. The flexible joint allows for resilient bending of the shaft or pole about the joint such that the shaft or pole can be resiliently bent towards the watercraft and automatically returned to the substantially vertical position.

The flexible joint is configured to form an angle between the shaft or pole and the mounting bracket that ranges from about 0 degrees to about 90 degrees or more in any direction.

The lighted tip is a light source comprising one or more light emitting diodes.

The lighted pole is configured for mounting to a boat.

The shaft has a length between about 12 and about 18 inches long.

The flexible joint comprises a spring. The spring may be a resilient spring and provided in a protective coating such as a rubber coating.

Electrical wiring for operably connecting the lighted tip to a power source is fed through an interior space along the length of the shaft from the lighted tip and through an interior space along a length of the flexible joint to the base such that the electrical wiring is not generally visible once the lighted pole is installed on a watercraft.

Another aspect of the present disclosure relates to a method of providing navigation light to a watercraft. The method includes securing a mounting mechanism of a lighted pole to an external surface of the watercraft in a mounting position where a shaft of the lighted pole extending from connection with the mounting mechanism and terminating in a light source extends in a substantially vertical direction away from the watercraft. Protecting the light source against damage due to the shaft or light source come into contact with an obstruction may be carried out by providing a flexible joint between the mounting mechanism and the shaft. The shaft and light source are displaced from the mounting position to a protection position where the flexible joint automatically moves the shaft or light source to a substantially non-vertical position and wherein when the obstruction is removed, the shaft, the light source automatically return to the substantially vertical direction.

Another aspect of the present disclosure relates to a lighted pole for mounting on a watercraft where the lighted pole has a mounting portion for securing the lighted pole to the watercraft; a rigid pole supporting a light source at a first end; and a flexible, resilient spring connecting the mounting portion to a second end of the rigid pole to provide a joint about which the rigid pole bends with respect to the mounting portion.

The spring supports the rigid pole in a plurality of non-vertical positions with respect to a mounting surface of the watercraft and automatically returns the pole to a substantially vertical position with respect to the mounting surface of the watercraft.

The light source comprises one or more LED lights and wherein the light source is provided in an epoxy for protection of the light source.

DETAILED DESCRIPTION

A watercraft navigation or illumination lighted pole has a base portion and mounting hardware for securing the lighted pole to a watercraft such as a boat, a shaft and a light source operably secured at a terminal end of the shaft. A flexible joint is provided at the base portion or otherwise between the mounting hardware and the shaft. The flexible joint is configured for enabling resilient movement of the shaft and light source attached thereto. The resilient lighted pole can be mounted to a watercraft such as a boat and may generally be mounted at the highest point on the watercraft. The light pole then extends upwardly therefrom such that when illuminated, the light can be seen by other watercraft operators or those within up to about a two-mile radius, depending on the weather conditions. When the lighted pole is installed in the mounting position, the shaft and light source extend substantially vertically from a mounting on the watercraft.

The flexible joint allows the pole to take one or more positions at an angle with respect to the base and thus the watercraft when external force is applied to any portion of the pole and/or light. That is, one or more protection positions include positions where the shaft and light source extend non-vertically from the mounting on the watercraft, the angle being provided and measured at the flexible joint. For example, the flexible joint may be a resilient joint that allows the pole to automatically fold or bend with respect to a direction of impact to a degree proportional to the impact, and then automatically resumes the previous position, the mounting position, thereafter.

If the light source is positioned on top of a watercraft which then passes under a bridge or other structure without sufficient clearance, the bridge or other structure will contact the light source and/or other surface of the lighted pole and cause the joint to flex or bend in a direction from the direction of impact such that the light pole and lighted tip are displaced towards the boat surface rather than breaking due to the impact with the low clearance surface.

The flexible joint is also resilient, meaning if the watercraft keeps moving until passing under the low clearance structure, once cleared, the flexible joint will return to a first position which is a generally linear or vertical position and thus the light pole and lighted tip will return to the vertical mounting position for use. The flexibility also allows for 360 degree movement of the light pole secured thereto as the flexible joint is preferably configured to flex or bend in any direction.

The light pole may also include a second joint that is a manual pivotal joint at the connection of the mounting mechanism to the base of the light pole. This pivoting joint allows a user to manually select the installation and thus mounting position of the light pole. The pivotal joint also allows a user to manually fold down the light pole for purposes of storage of the watercraft having the light pole installed thereon during off seasons or when the watercraft is loaded onto a boat lift and thus under a flexible cover for an extended period or time, or when the water level is high and the boat is stored. This is a joint that may be separate from the flexible joint described above and can be used manually.

Figure 1:
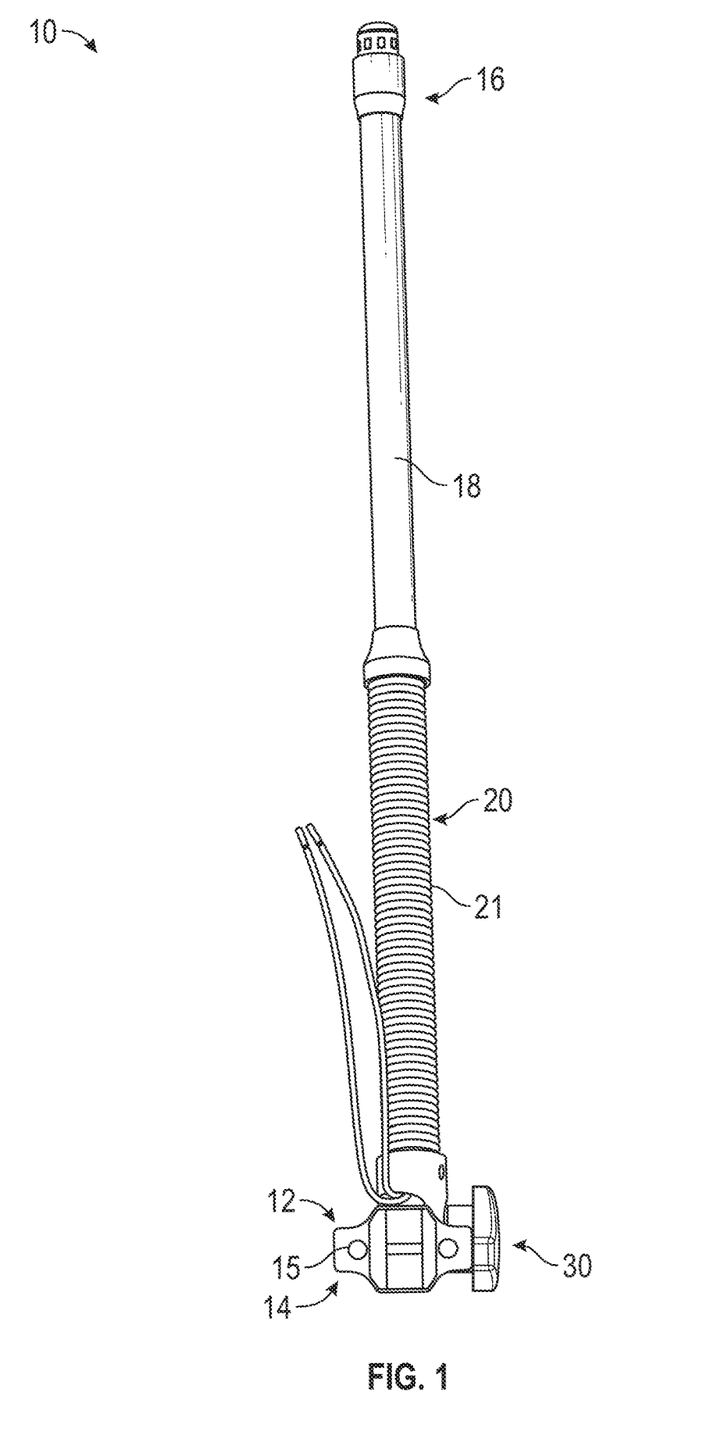
FIG. 1 is a side view of a light pole having a flexible joint.
Figure 2:
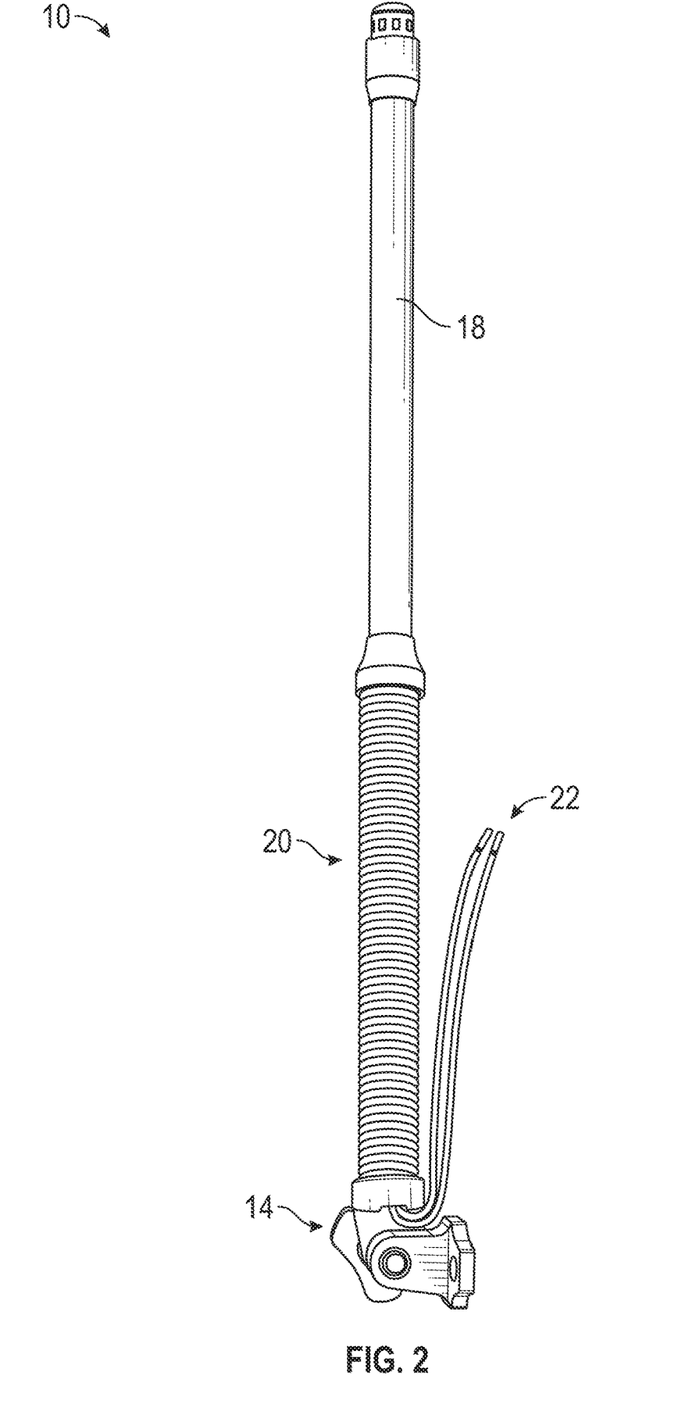
FIG. 2 is another side view of the light pole in a mounting position.
Figure 3:
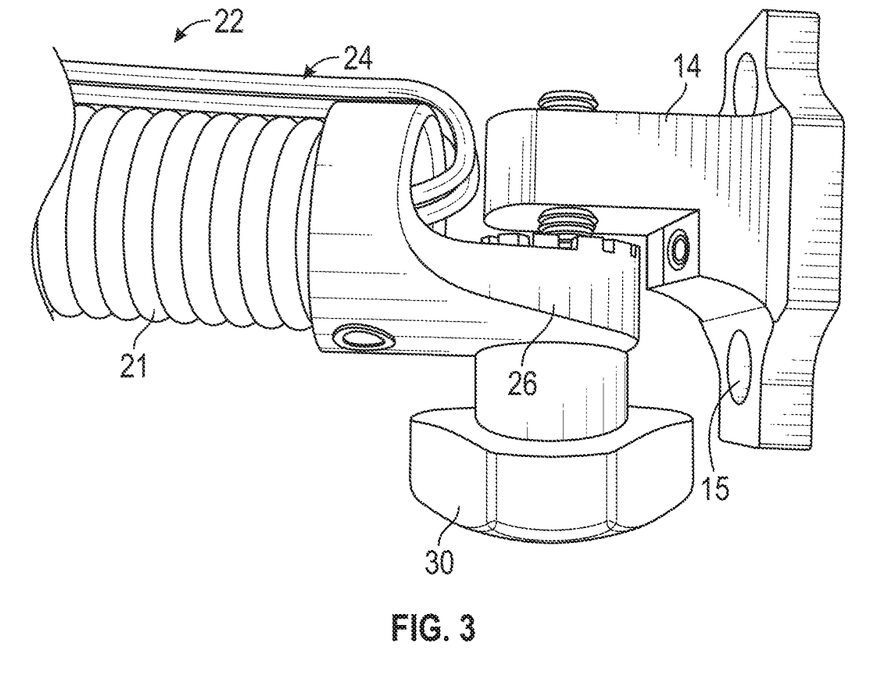
FIG. 3 is a side view of a base of the light pole.
Figure 4:
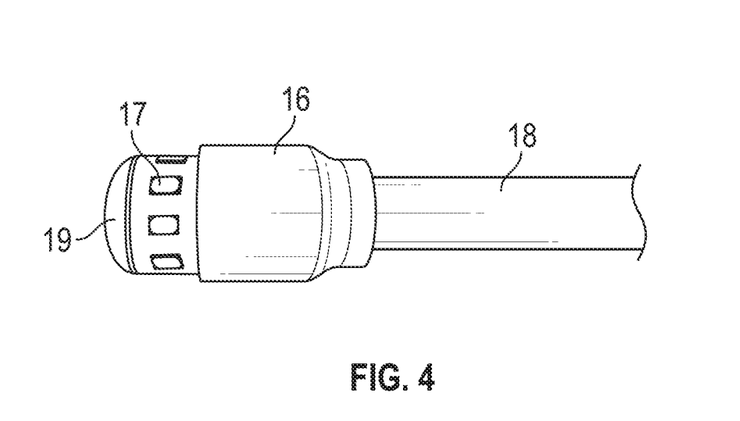
FIG. 4 is a side view of a tip of the light pole.
Figure 5:
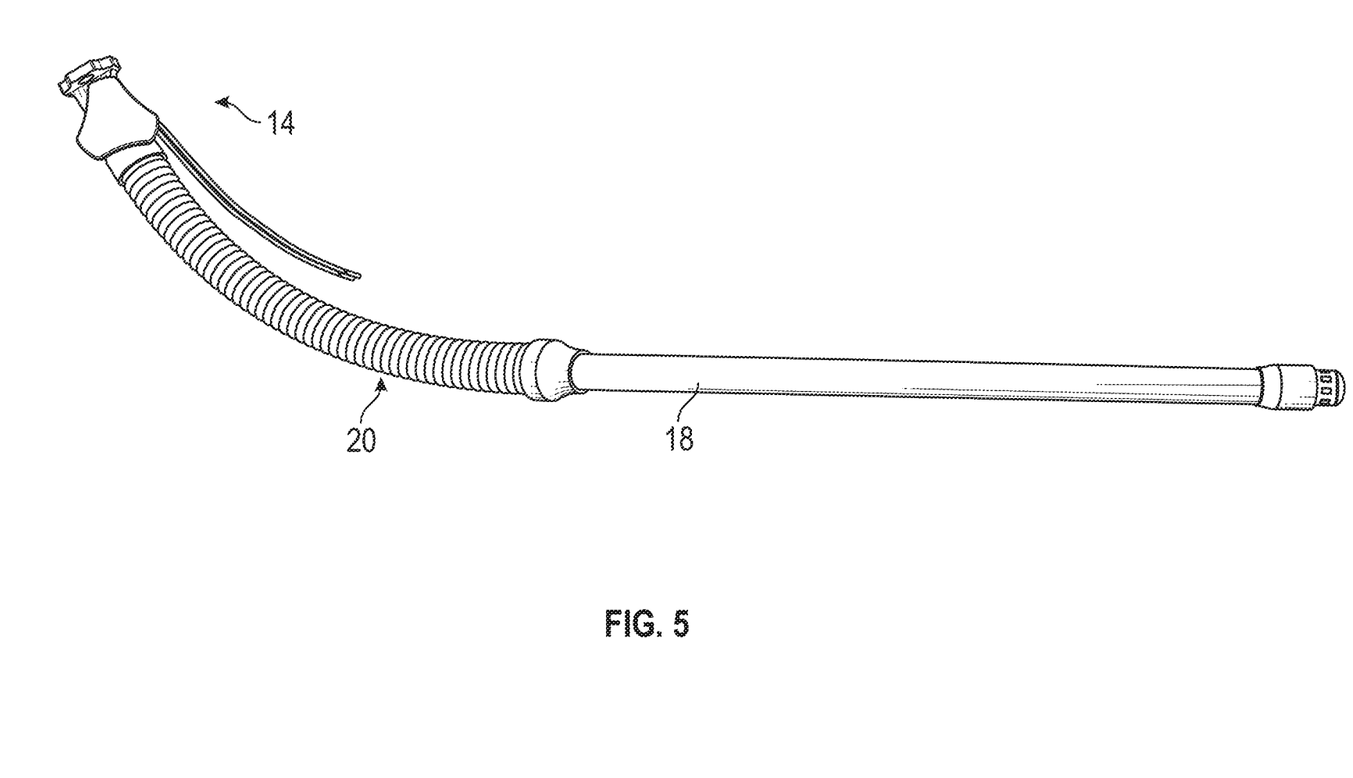
FIG. 5 is a side view of the light pole in a protection position.
Figure 6:
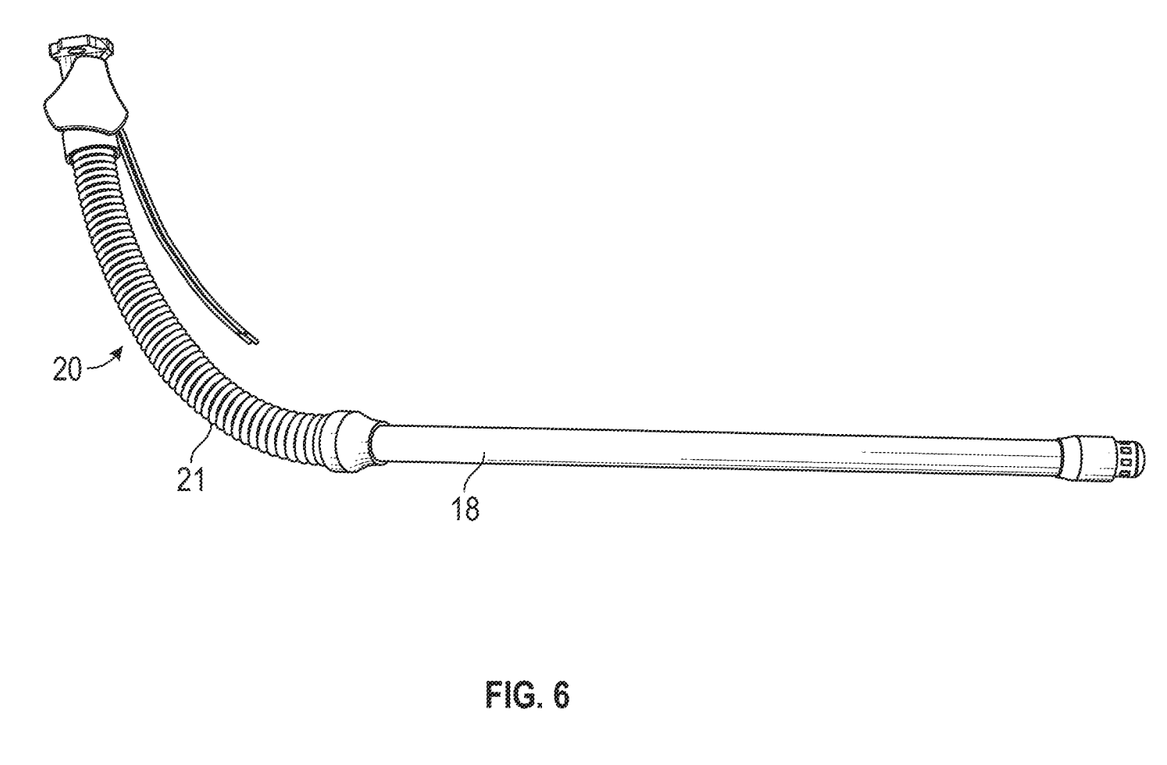
FIG. 6 is another side view of the light pole in a protection position.

The resilient watercraft light assembly 10 for attaching to a watercraft is illustrated generally in FIGS. 1-6. The flexible watercraft light assembly 10 comprises a base 12 and a mounting mechanism 14 for connecting the assembly 10 to the watercraft and lighted tip 16 with a shaft or light pole 18 extending therebetween. A flexible joint 20 is positioned at or between the base portion 12 and the shaft 18 to connect the mounting mechanism 14 to the shaft or light pole 18. The flexible joint 20 allows for 360 degree bending or flexing of the assembly about the joint 20. As illustrated in FIGS. 5-6, the lighted tip 16 can be moved to a non-vertical position, referred to as a protection position, preferably in any direction through bending at the joint and moved back towards a substantially vertical mounting position with respect to the base 12.

Referring first to the base 12 as illustrated in further detail in FIG. 3, in the embodiment illustrated the base portion has a first end 24 for securing to the flexible joint 20 and a second end 26 for securing to the mounting mechanism 14. The base portion 12 may be removably and/or rotatably connected to the mounting mechanism 14 at a second joint, a pivoting joint. That is, a threaded clamping or other mechanism may be provided for securing the base 12 to the mounting mechanism 14 such that the base 12 can be positioned and secured with respect to the mounting mechanism 14. For example, if a mounting surface of the watercraft is not substantially horizontal, the mounting mechanism 14 can be secured to the mounting surface and the shaft 18 positioned in a vertical manner by way of adjusting the mounting of the base 12 to the mounting mechanism 14. Each of the mounting mechanism 14 and the base 12 may then have apertures 15 of substantially the same size and internally threading for receipt of an externally threaded clamping mechanism 26 allowing for the adjustable positioning of the mounting bracket 14 with respect to the base 12. This connection of the mounting mechanism 14 to the base 12 also allows for manual pivoting of the light pole assembly 10 about the connection so that the entire assembly but for the mounting mechanism can be manually folded down for storage or transport as described previously and manually moved back to and secured in an upright manner for use.

The light assembly 10 is mounted in a generally upright manner, for example, the light assembly 10 extends vertically from a connection with a mounting surface of the watercraft. It is contemplated and within the scope of the disclosure that the assembly can be mounted in a manner that is offset from the vertical and the assembly will function in substantially the same resilient manner, however, a substantially vertical mounting position is referred to hereinafter. The flexible joint 20 allows the lighted tip 16 to be displaced in a direction according to the direction of force applied to the shaft 18 or lighted tip 16 such that the lighted tip 16 is displaced with respect to the mounting surface. When mounted for use, the assembly 10 is a generally linear assembly, without bends along the length of the assembly 10. In the embodiment illustrated, the assembly 10 is mounted in a substantially vertical or upright position such that in the mounting position the lighted tip 16 is generally in-line with the base 12. There is a zero or about zero angle in the flexible joint 20. When the lighted tip 16 and/or a surface of the shaft 18 are hit or contacted by a structure, rather than breaking or dislodging from the mounting connection 14, the lighted tip 16 is resiliently or temporarily moved to a protection position where an angle measured at the flexible joint provides an angle between the base 12 or mounting mechanism 14 and the lighted tip 16 that can be anywhere in the range of about greater than zero to about 90 degrees or greater than 90 degrees and preferably in any direction.

As illustrated in FIG. 4, the lighted tip 16 supports one or more light sources 17. Examples of the light sources include but are not limited to LED lights. In the embodiment illustrated, there are five LED lights in the lighted tip, four LED lights surround a perimeter of the tip and a fifth light is positioned at a distal terminal, upward or outward surface of the tip. Additional or fewer lights may be used and such embodiments are within the scope of this disclosure. The light source is configured to diffuse from the tip 16 and provide sufficient illumination for purposes of identifying the presence of the watercraft to other watercraft users and illuminating the watercraft where the light can be seen in all directions up to about two-miles away.

The lighted tip 16 may have a protective casing comprised of plastic with or without a protective coating such as an epoxy based coating 19. In the embodiment illustrated, the lighted tip 16 is actually protected by an epoxy material. The lights 17 are set directly in an epoxy resin for protection, thus eliminating the requirement for a plastic casing or shell surrounding the light source. While epoxy coatings can increase the shatter resistance of plastic or glass shells or casings, the shell or casing itself can crack or fracture under the epoxy coating, thus containing the shards but inhibiting the diffusion of the light within the casing or preventing the light emission from having a uniform color associated with the color of the casing such as red, green, or orange.

A mold may be used for setting the lighted tip 16 in a clear or translucent epoxy based enclosure or the LED light sources of any color may be in-molded in the epoxy for further destruction prevention. The lighted tip 16 may be further secured to the terminal end of the shaft 18 via the epoxy molding. As such, in the event the lighted tip contacts or hits a hard surface where a plastic casing or a plastic casing coated with epoxy would otherwise crack or shatter, the lighted tip remains intact and usable.

As illustrated in further detail in the figures and as shown in FIGS. 5-6, the flexible joint 20 may comprise a spring 21. Examples of flexible joints 20 include but are not limited to a cantilever spring, a coil spring, a helical spring including tension or extension springs, or a flat spring. The flexible joint 20 may comprise a rubber joint or other resilient joint and/or the joint may have a rubber coating for protection. The flexible joint 20 is configured to provide resilient bending between the mounting mechanism 14 and the shaft 18 and moreover support the shaft 18 and light source 16 in an upright and vertical position when not flexed or bent.

The length of the flexible joint 20 with respect to the overall length of the watercraft light assembly 10 may be in the range of ¼ of the overall length of the assembly to ⅓ or ½ of the overall length of the assembly. The length of the spring 21 of the flexible joint 20 may be substantially the same length as the shaft 18 or may be shorter than the length of the shaft 18.

The spring 21 is then positioned to connect the base 12 and mounting hardware 14 to the shaft 18. The electrical wiring 22 may also be fed through an interior opening along the length of the spring 18 to the base 12. The spring 21 allows for bending such that the connected shaft 18 can be displaced corresponding to the bending or other flexure of the spring 21, including compression or extension. The spring 21 also is of a construction such that the spring can be preferably bent or flexed in multiple directions, providing essentially a 360 degree allowance for direction of bending or flexure of the spring 21 and the spring is resilient such that the spring returns to its original position automatically after the force causing the bending or flexure is removed. In the case of a flat spring, the spring would permit flexing in only two directions.

In further detail, the shaft 18 is a hollow tube of a selected length which may be in the range of about 12 inches to 18 inches. The length of the shaft 18 may be increased or decreased based at least in part on the selected end use of the light with respect to different watercraft. Electrical connections 22 for operably connecting the light source 16 to a power source on the watercraft are fed through this hollow tube and are protected by the shaft 18. The electrical wiring 22 for example extends from connection with the light source or light sources 16, through the tube 18 and exits the tube at the flexible joint 20, where the electrical connections 22 may also pass through an interior space of the flexible joint 20 to the base 12 or through the mounting hardware connected to the base 12.

In the embodiment illustrated, the shaft 18 is a rigid construction and the tube is a metal or plastic tube. However, the shaft 18 may further be comprised of a material that provides some flexibility or degree of bending to the shaft 18 itself and such constructions are within the scope of this disclosure. The shaft 18 should have a degree of rigidity sufficient to maintain the upright position of the shaft 18 and lighted tip 16 in the vertical mounting position when mounted to the watercraft and in such mounting position when the watercraft itself is moving or out in windy conditions, or otherwise when the lighted pole is not hit or contacted by an obstruction or other low clearance surface for example.

While a substantially vertical mounting position is referred to herein, the mounting position may be varied from substantially vertical and/or linear (e.g., positioned on a side of a boat rather than an upright surface). Varying the position of the flexible joint 20 and shaft 18 with respect to the mounting mechanism 14 can be done by way of manual positioning and adjustment setting via rotation of knob 30 or other means for securing the position of the base 12 with respect to the mounting mechanism 14. Thus, it is contemplated and within the scope of this disclosure that the mounting position may be adjustable.

Using the lighted pole described herein comprises securing the lighted pole at the mounting mechanism to an external surface of the watercraft. When installed, this position is a generally vertical position referred to as a mounting position where the lighted pole extends from connection with the mounting mechanism in a substantially vertical manner with the light source positioned above the watercraft. The flexible joint then protects the light source against damage as when the shaft or light source comes into contact with an obstruction—that is, when the light source or the shaft is hit or runs into a stationary object for example, the shaft and light source are displaced from the mounting position to a protection position, rather than shattering or breaking on impact. The flexible joint automatically moves the shaft or light source to a substantially non-vertical position sufficient to avoid cracking, breaking or shattering of one or more components of the lighted pole. Once the obstruction is removed, for example, after the boat has passed under a low clearance structure and returns to open water for example, the flexible joint is resilient such that the shaft and light source automatically return to the substantially vertical direction.

Although the present disclosure has been described with reference to preferred embodiments, workers skilled in the art will recognize that changes may be made in form and detail without departing from the spirit and scope of the disclosure.

The invention claimed is:

1. A lighted pole for mounting on a watercraft comprising a base portion and a lighted tip with a shaft extending therebetween and a flexible joint positioned between the base portion and the shaft, wherein the base portion has an opening for receiving an end of the flexible joint and for receiving electrical wiring operably connected to the lighted tip therethrough and the base portion has a surface offset from the opening for pivotally securing the base portion to a mounting mechanism with the electrical wiring bypassing the mounting mechanism for operably securing the lighted pole to the watercraft; and wherein an angle between the mounting mechanism and the base portion is selectively adjustable and securable by a manual locking mechanism, allowing the lighted pole to be secured to a non-horizontal surface of the watercraft or manually lowered for storage or transport of the watercraft.

2. The lighted pole of claim 1, wherein the mounting mechanism comprises a bracket configured for mounting to a surface of the watercraft such that the lighted pole is installed in a position extending outwardly or upwardly from the watercraft and wherein the flexible joint allows for resilient bending of the shaft about the joint such that the shaft can be resiliently bent towards the watercraft.

3. The lighted pole of claim 2, wherein the flexible joint comprises a resilient spring.

4. The lighted pole of claim 3, wherein the resilient spring comprises a rubber coating.

5. The lighted pole of claim 2, wherein the flexible joint is configured to form an angle between the shaft and the base ranging from about 0 degrees to about 90 degrees or more in any direction.

6. The lighted pole of claim 2, wherein the lighted pole is configured for mounting to a boat.

7. The lighted pole of claim 2, wherein the shaft is between about 12 and 18 inches long.

8. The lighted pole of claim 2, wherein electrical wiring for operably connecting the lighted tip to a power source are fed through an interior space along the length of the shaft from the lighted tip and through an interior space along a length of the flexible joint to the base.

9. The lighted pole of claim 1, wherein the lighted tip is a light source comprising one or more light emitting diodes.

10. A method of providing a navigation light to a watercraft comprising:
   securing a mounting mechanism of a lighted pole to an external surface of the watercraft in a mounting position;
   manually adjusting an angle between the mounting mechanism and a shaft of the lighted pole extending from connection with the mounting mechanism wherein the shaft terminates in a light source such that the shaft extends in a substantially vertical direction away from the watercraft;
   directing electrical wiring through an opening in a base of the lighted pole, the electrical wiring bypassing the mounting mechanism and operably connecting the lighted tip to a power source;
   protecting the light source against damage by providing a flexible joint between the mounting mechanism and the shaft such that when the shaft or light source come into contact with an obstruction, the shaft and light source are displaced from the mounting position to a protection position where the flexible joint automatically moves the shaft or light source to a substantially non-vertical position and wherein when the obstruction is removed the shaft and light source automatically return to the substantially vertical direction; and
   manually adjusting the angle between the mounting mechanism and the shaft of the lighted pole such that the shaft is folded down toward the surface of the watercraft.

* * * * *